US006795791B2

(12) United States Patent
Gorman

(10) Patent No.: US 6,795,791 B2
(45) Date of Patent: Sep. 21, 2004

(54) SYSTEM AND METHOD FOR TESTING TIME-VARYING SIGNALS

(75) Inventor: Atarbes K. Gorman, San Jose, CA (US)

(73) Assignee: BEA Systems, Inc., San Jose, CA (US)

( * ) Notice: Subject to any disclaimer, the term of this patent is extended or adjusted under 35 U.S.C. 154(b) by 153 days.

(21) Appl. No.: 09/941,195

(22) Filed: Aug. 28, 2001

(65) Prior Publication Data

US 2003/0004669 A1 Jan. 2, 2003

Related U.S. Application Data

(60) Provisional application No. 60/300,512, filed on Jun. 22, 2001.

(51) Int. Cl.[7] .............................................. G06F 19/00
(52) U.S. Cl. ........................ 702/124; 703/14; 714/725
(58) Field of Search ................................. 702/110, 116, 702/118, 120, 122–126, 182, 183, 186; 717/104, 107; 709/227; 714/725; 370/335

(56) References Cited

U.S. PATENT DOCUMENTS

| | | | | |
|---|---|---|---|---|
| 5,790,977 A | * | 8/1998 | Ezekiel ........................ 702/122 |
| 6,131,080 A | * | 10/2000 | Raimi et al. ................... 703/14 |
| 6,163,797 A | * | 12/2000 | Eckley et al. ................ 709/203 |
| 6,237,135 B1 | * | 5/2001 | Timbol ......................... 717/107 |
| 6,360,268 B1 | * | 3/2002 | Silva et al. ................... 709/227 |
| 6,393,591 B1 | * | 5/2002 | Jenkins et al. ............... 714/725 |
| 6,505,342 B1 | * | 1/2003 | Hartmann et al. ........... 717/104 |
| 6,542,845 B1 | * | 4/2003 | Grucci et al. ................ 702/122 |
| 6,556,218 B1 | * | 4/2003 | Alcorn ......................... 345/749 |
| 6,578,191 B1 | * | 6/2003 | Boehme et al. .............. 717/107 |

FOREIGN PATENT DOCUMENTS

WO    WO 00/77632    * 12/2000    ............. G06F/9/46

OTHER PUBLICATIONS

Fabio Marchisio and Laurent Balmelli, LCAV Interactive Digital Signal Processing Library, 1998, Laboratory for Audio–Visual Communication, Swiss Federal Institute of Technology.*

* cited by examiner

Primary Examiner—Marc S. Hoff
Assistant Examiner—Mohamed Charioui
(74) Attorney, Agent, or Firm—Fliesler Meyer LLP

(57) ABSTRACT

The present invention includes a system and method for generating a signal particularly useful in testing JMX monitors using a generator bean, such as a signal generating Java Mbean. A user can specify equations and/or parameters in order to determine the type of signal to be generated. The generator bean is then polled at a frequency at least twice the frequency of the generated signal using a monitor MBean of the JMX monitor. A testing value is returned for each polling of the generator bean.

21 Claims, 5 Drawing Sheets

SYSTEM AND METHOD FOR TESTING TIME-VARYING SIGNALS

CLAIM OF PRIORITY

This application claims priority to Provisional patent application Serial No. 60/300,512, filed Jun. 22, 2001, entitled SYSTEM AND METHOD FOR TESTING TIME-VARYING SIGNALS.

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

TECHNICAL FIELD

The present invention relates generally to the testing and generation of signals that may vary over time.

BACKGROUND

Java Management Extensions (JMX) define a community process standard for managing resources and remotely accessible agents. JMX is a trademark of Sun Microsystems. Inc. JMX defines an architecture for network and/or application management in the Java programming language, as well as design patterns, services, and APIs. JMX utilizes the standard industry model Managed Beans, or MBeans, for use in Java programs and management applications. MBeans are Java objects that implement application resources. These MBeans may be managed by a JMX agent or other agent supporting the MBean concept. A set of complimentary services is typically specified, which work with these MBeans to monitor and manage Java-based applications. A monitoring Mbean, or JMX monitor, may be dynamically loaded by an application, and may send an event or notification when the component or parameter being monitored reaches a certain value or state.

JMX monitors typically detect and monitor signals that vary over time, functioning similar to a digital sampling oscilloscope. When developing these monitors, it is desirable to be able to test not only for accuracy, but also for stress and load capabilities. Digital signal generators of the prior art are typically used in the analog realm, and lack the necessary JMS format capabilities needed to test these JMX monitors. These prior art signal generators also fail to generate unorthodox signals, such as a string of words.

It is therefore an object of the invention to develop a method and system for testing a JMX monitor that can run for an extended duration, allowing for controllable stress and load testing.

SUMMARY

The present invention includes a system for testing signal monitors, such as JMX monitors. The system utilizes a generator bean to generate a signal. A user may specify an equation and/or parameters to be used in generating an appropriate signal. A monitor bean is used to monitor the signal being generated. A notification is created by an MBean in response to the monitoring, such as may notify a user or application that the signal has reached a certain value, or may store the current value to a data store.

Also included in the present invention is a method for testing a JMX monitor. In the method, a signal is generated using a generator bean, such as a signal generator Java MBean. Equations and/or parameters may be specified in determining the type of signal to be generated. The generator bean is then polled at a frequency at least twice the frequency of the generated signal using a monitor MBean of the JMX monitor. A testing value is then returned for each polling of the generator bean.

DETAILED DESCRIPTION

A signal generator in accordance with the present invention comprises an MBean, hereinafter referred to as a SignalGeneratorMBean. A SignalGeneratorMBean is an interface that conforms to the static MBean design patterns. This embodiment includes classes derived from an application, such as SignalGenerator, which generates the desired signal(s). Equations can be used by the SignalGeneratorMBean to precisely define the desired testing signals to be used. Users can specify or set values and select the appropriate equation(s) for each testing situation. The equations can be entered by the user, stored in a library or file, hard coded into the application, or accessed by any other appropriate means. Users may select or set values by such means as direct entry, selection, or from a file or library containing predetermined values.

Figure 4:
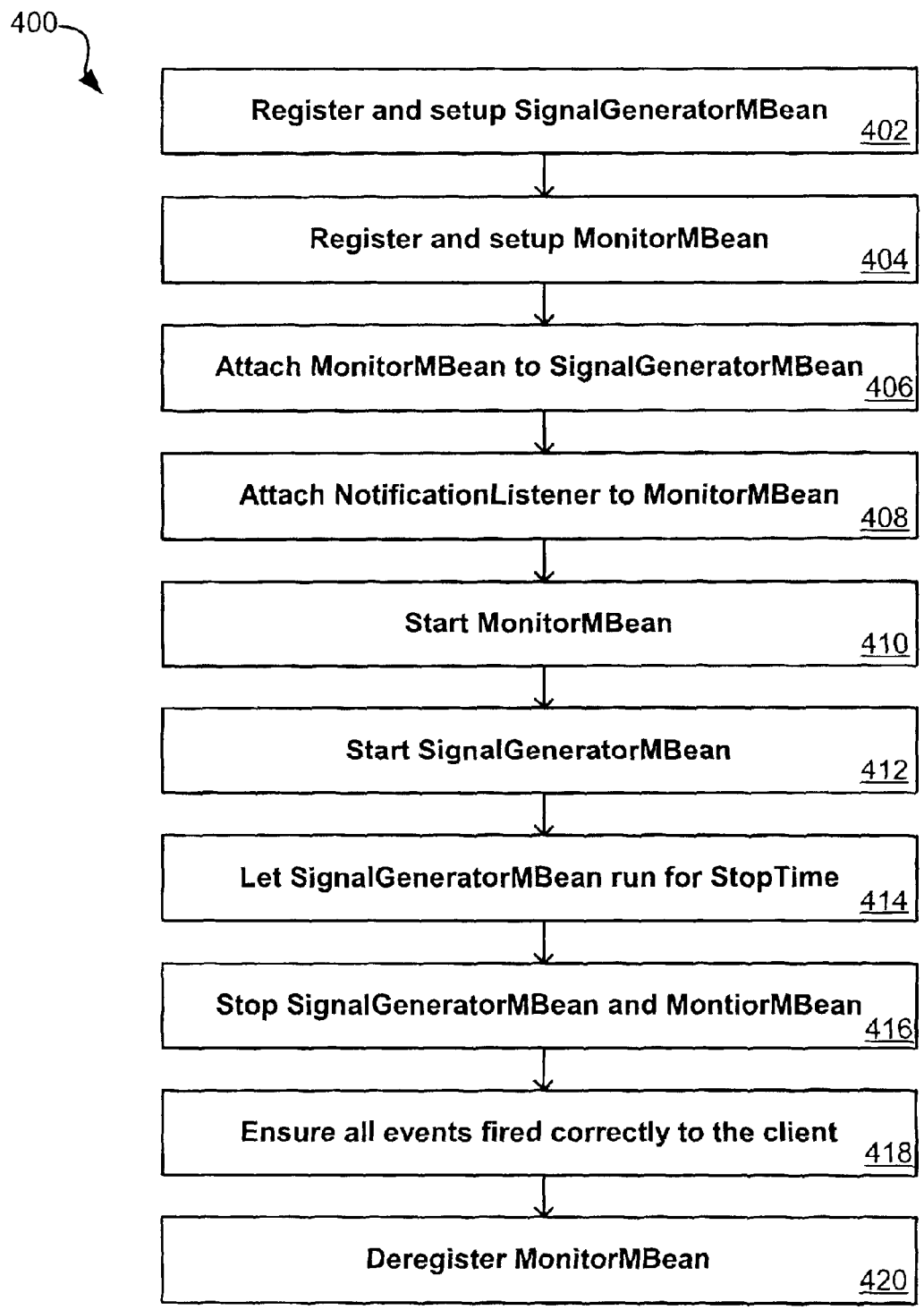
FIG. 4 is a flowchart showing the testing steps of one embodiment of the present invention.

In one approach for JMX monitoring tests in accordance with the present invention, the sequence of events may be enforced by a class, such as for example MonitorMBeanTestDriver. Steps of such a sequence are shown in FIG. 4. In this embodiment 400, the class includes four parameters: (1) SignalGeneratorMBean for generating the signal, (2) MonitorMBean for monitoring the generated signal, (3) NotificationListener to listen to MonitorMBean and generate a notification upon certain conditions, and (4) StopTime to designate the duration of the test. These parameters, as well as others, can be specified for each test.

Initially, SignalGeneratorMBean is registered with the system and setup for testing 402. MonitorMbean is also registered and setup appropriately 404. MonitorMBean is attached to SignalGeneratorMBean 406 such that MonitorMBean can monitor the generated signal. NotificationListener is attached to MonitorMBean 408 so a notification can be generated for appropriate circumstances, such as MonitorMBean detecting a signal surpassing a threshold value. Once the system is setup, MonitorMBean can be started 410. SignalGeneratorMBean is also started 412. SignalGeneratorMBean is allowed to run for a set time, herein referred to as StopTime 414. After the set time has passed, SignalGeneratorMBean and MonitorMBean are stopped 416. All events are checked to see if they correctly fired to the client 418. If so, MonitorMBean is deregistered 420.

Figure 5:
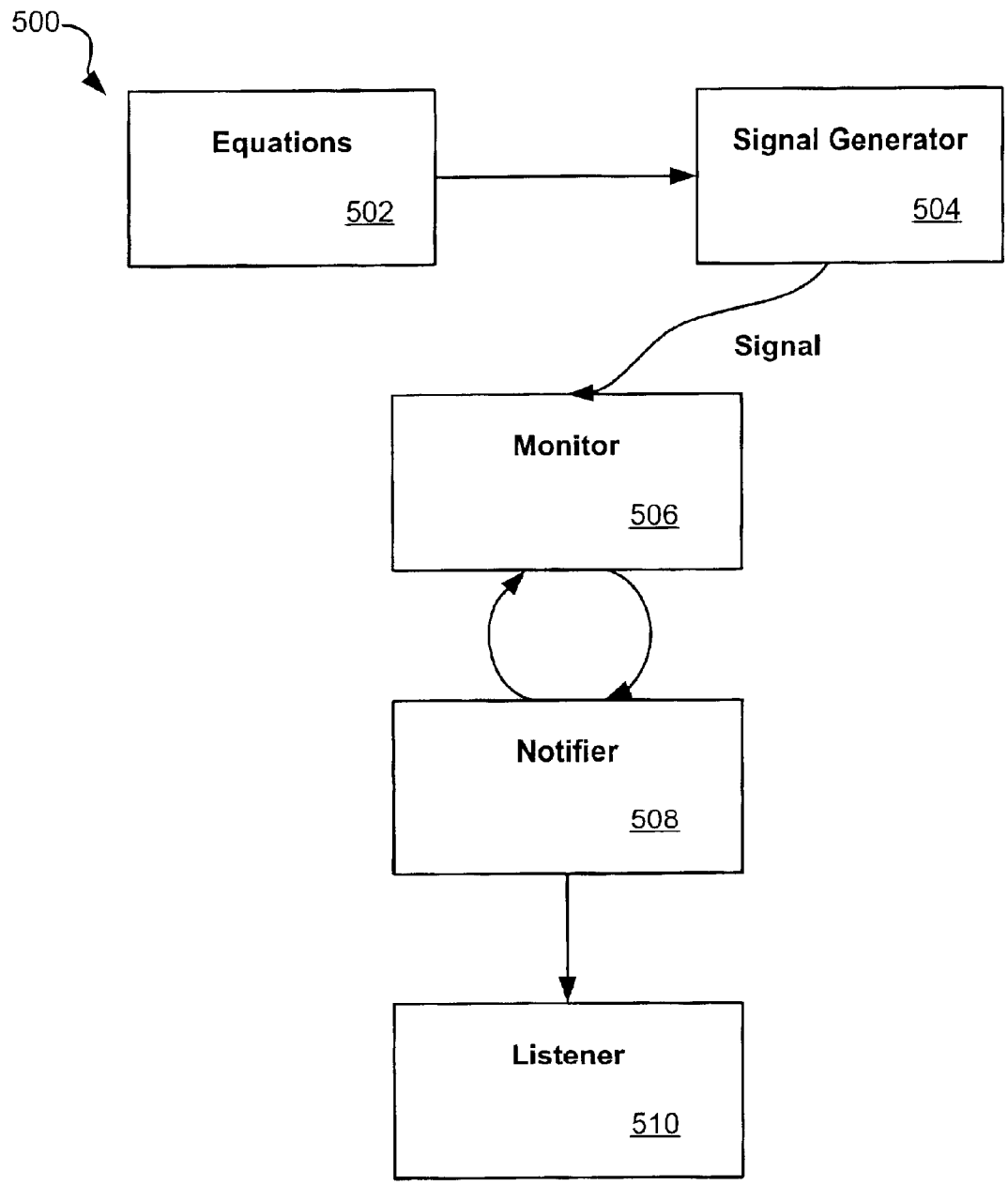
FIG. 5 is a diagram of a testing system in accordance with one embodiment of the present invention.

One view of a system 500 in accordance with the present invention is shown in FIG. 5. In this embodiment, a set of equations 502 is used to input a desired signal form to the signal generator 504. The signal generator 504 generates a signal according to the input equation, which is received by a monitor 506. The monitor 506 is in communication with a notifier 508. The monitor can send a signal to the notifier in one embodiment, while the notifier can poll the monitor in another embodiment. When the monitor sends a response or signal to the notifier regarding measurement of the signal, the notifier can send a notification to a listener 510, which is adapted to receive the notification and act accordingly, such as by sending a message to a user or recording a data point.

Some tests may be time sensitive. In one embodiment, the failure to meet a timepoint for a particular test, such as may be due to network latency or logic server errors, can cause the test to abort. Other embodiments may utilize an error handling routine, throw an exception, or utilize any other appropriate error handling approach. Any errors can also be logged, such that the resultant logs can later, or concurrently, be analyzed.

Figure 1:
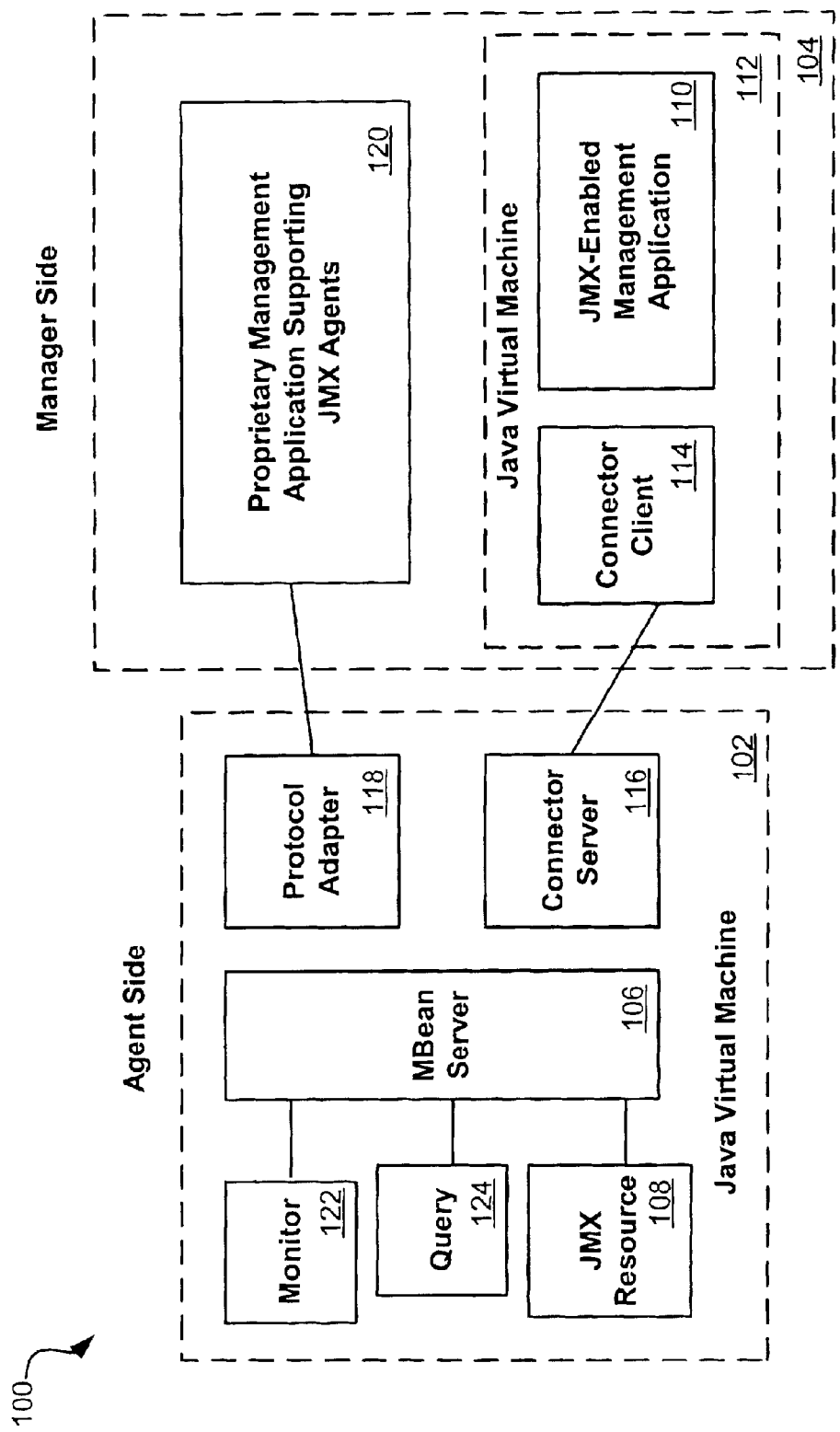
FIG. 1 is an illustration of an agent architecture in accordance with one embodiment of the present invention.

The functional blocks for the embodiment 100 shown in FIG. 1 may be mapped to a server, such as a logic server ("LS"). The MBean server 106 on the agent side 102 of the figure corresponds to an LS. The JMX managed resource 108 on the left is an MBean that corresponds to a service component, such as an Enterprise Java Bean or Java Messaging Service. The MBeanServer 106 can be accessed by any appropriate method known in the art, such as by performing a JNDI (Java name directory interface) lookup. The MBeans, including the Monitor MBean 122 and Query MBean 124, can be retrieved with an exact lookup or with a query, such as may be based upon an MBean ObjectName.

The tests described in this embodiment correspond to a JMX-enabled management application 110, as may be contained in a Java virtual machine 112. The JMX-enabled management application 110 is shown on the manager side 104 of FIG. 1. Communication between the manager-side Java virtual machine 112 and the agent side 102 can be accomplished through, for example, a connector client 114 and connector server 116. The agent side can also utilize a protocol adapter 118 to communicate with an application supporting JMX agents 120. These tests can communicate directly with the MBean server 106 to access runtime MBeans. Runtime MBeans represent the runtime configuration and metrics of a domain as it is running. Runtime MBeans in this embodiment are not modifiable, but may be modified in other embodiments. In order to accurately capture values, a RuntimeMBean can be sampled at a frequency at least twice that of the signal being measured. Each test can then specify the desired testing frequency.

These tests can independently assess measurements made by the RuntimeMBean, in order to determine a pass/fail result. In a first technique, a carefully controlled test/server interaction can be used, such that the expected return value can be known beforehand. In a second technique a feature outside of the LS, such as the system time, can be used to measure a feature of the LS independent of its own internal mechanisms. This second technique is not exact, and therefore may include a margin of error. It will be evident to those skilled in the art that other similar or appropriate techniques may be used that are within the spirit and scope of the invention.

A class such as SignalGenerator may implement the SignalGeneratorMBean interface for all but one method, such as for example SignalGenerator::calculateValue(time: long). Subclasses of SignalGenerator, such as may implement the method CalculateValue, can create a time-varying signal that starts at time 0, when a method SignalGenerator::start is called. As an example, a sinusoidal signal may be implemented as sin(wt) where t is the time and w is the angular velocity.

Figure 2:
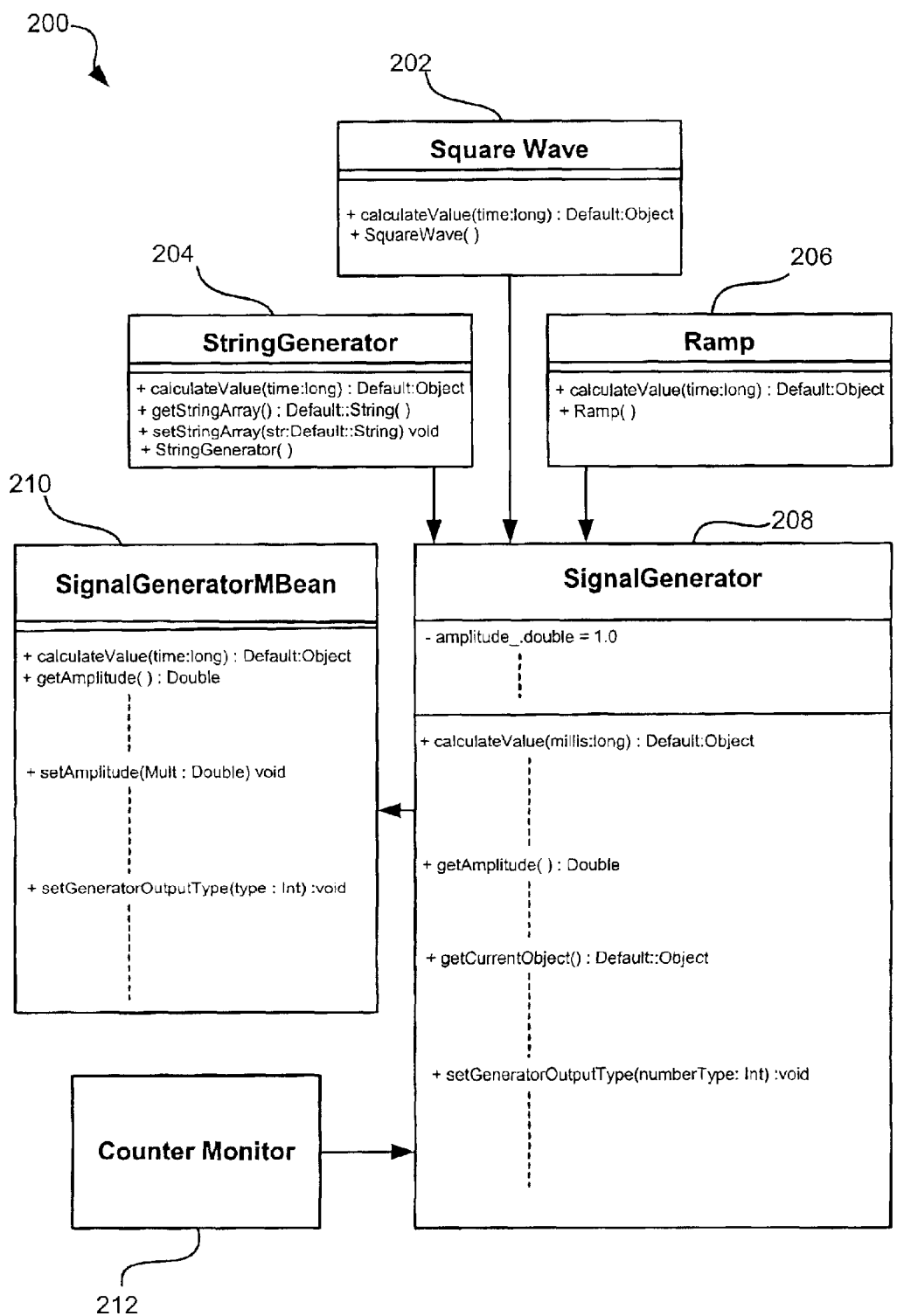
FIG. 2 is an example sequence diagram for a test in accordance with one embodiment of the present invention.

A sequence diagram is shown in FIG. 2 for one such test 200 of the present invention. FIG. 2 shows the dynamic runtime behavior of a class such as SquareWave 202, StringGenerator 204, or Ramp 206. These classes may be subclasses that are derived from SignalGenerator 208. FIG. 2 also shows a structural placement of the class SquareWave 202 within the test 200. CounterMonitor 212 is a class that is responsible for polling the signal under observation. CounterMonitor 212 may, for instance, call a getCurrentObject or similar method of the SignalGenerator 208 class in order to get the current time. SignalGenerator 208 may then implement SignalGeneratorMBean 210. A granularity period exists between successive polling of SquareWave 202 by CounterMonitor 212. If one of the pollings exceeds a certain threshold value, CounterMonitor 212 may notify a notification listener.

GenericNotificationListener is one such test class that may be called by CounterMonitor when a signal being polled meets predefined conditions, such as the aforementioned threshold value, with the conditions being defined by CounterMonitor. GenericNotificationListener can also be responsible for storing values deemed important by CounterMonitor. TestCounterMonitor is an example of a class that can be called by an end user or another object or application in order to execute the test.

Figure 3:
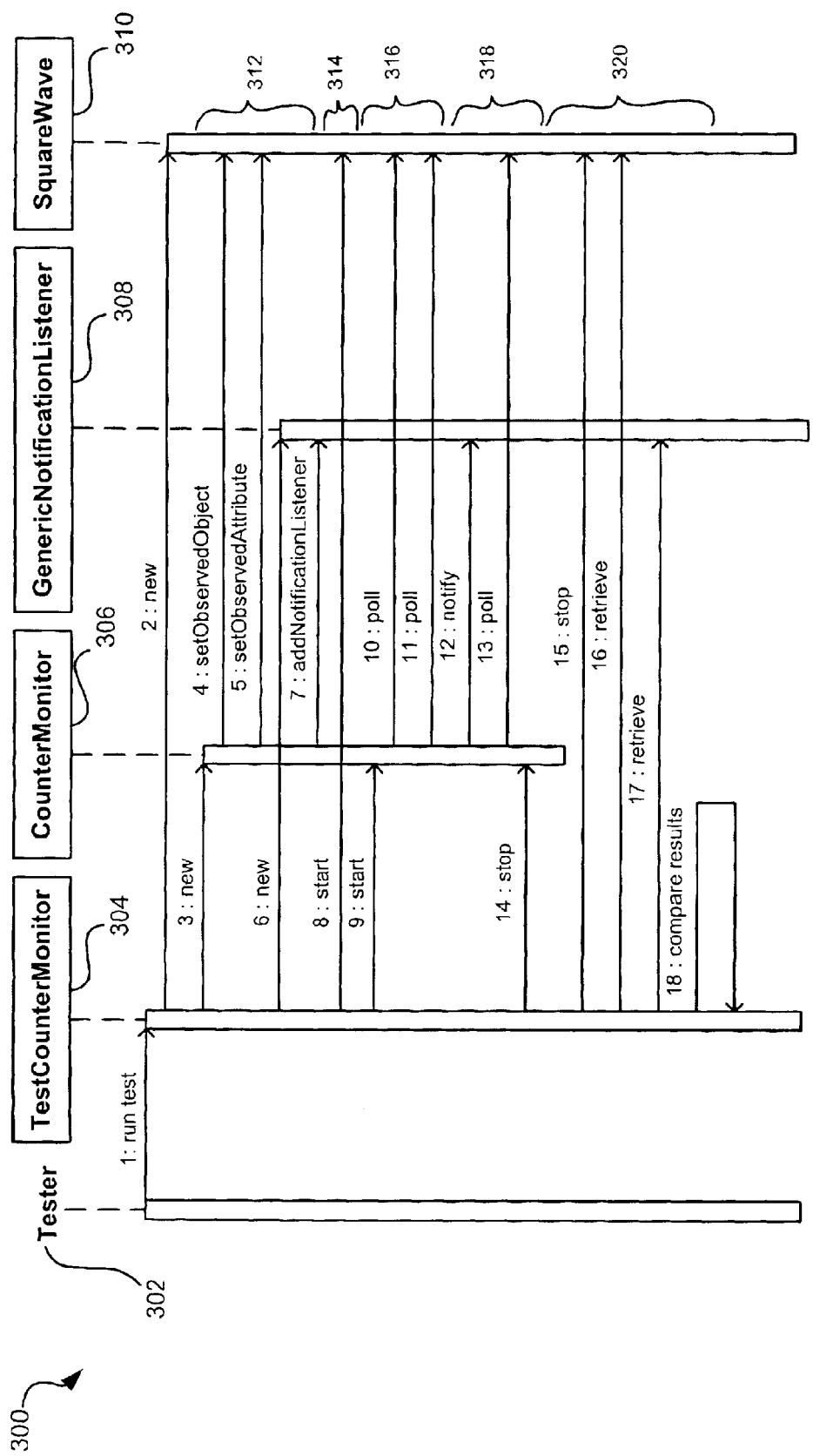
FIG. 3 is a diagram of a testing process in accordance with one embodiment of the present invention.

Another view of a testing process of the present invention is shown in FIG. 3. In this test 300, a tester 302 or end-user runs TestCounterMonitor 304. During the setup portion 312, TestCounterMonitor 304 initiates CounterMonitor 306, which in turn polls SquareWave 310 and initiates GenericNotificationListener 308. Once the setup portion 312 is complete, the testing is started 314, as CounterMonitor 306 polls SquareWave 310, and continues polling 316 according to the granularity setting. In the event that a threshold or value is reached or exceeded, CounterMonitor 306 can notify 318 GeneritcNotificationListener 308 and can continue polling SquareWave 310. After the polling process is complete, the process is stopped 320. SquareWave 310 can then store the testing values, and TestCounterMonitor 304 can compare the results.

Table 1 shows some of the symbols that may be used in the signal equations, a description of each symbol, a preferred range of values for each symbol, and example values. Some of the signal equations using these symbols are shown in Table 2, as well as the subclasses that implement those signals. For example, if a signal is to be generated that increases monotonically over time, the Ramp signal equation can be used, which is equivalent to the basic equation for a line (y=m*x+b). In Ramp, m is the slope or rate of increase of the linear signal over time, while b is the y-intercept, or the initial value of the signal at time zero.

These equations may form a library of possible signals that can be generated, providing a significant level of flexibility to the system. A developer can produce new signals simply by selecting the proper equation and setting proper values for each variable in the selected equation. It may also be possible, if the library of equations is not sufficient, for the developer to enter a new equation into the library in order to generate a new signal type.

TABLE 1

Preferred equation symbols

| Symbol | Description | Type | Example |
|---|---|---|---|
| m | Multiplier, slope or amplitude | scalar number, $-\infty < m < \infty$ | 4.87, 2, −78.9, 0.0 |
| b | offset, y-intercept | scalar number, $-\infty < b < \infty$ | 4.87, 2, −78.9, 0.0 |
| t | Time | scalar integer, $0 < t < \infty$ | 0, 14, 60 |
| T | Period | scalar integer, $0 < T < \infty$ | 0, 14, 60 |
| n | Iterations | scalar integer, $0 < n < \infty$ | 0, 1, 2, 3 |
| f(t) | Function | Function of time | f(0) = 3, f(1) = 6, f(2) = 9 |
| d(t) | unit impulse f'n | Function, $_{-\infty}\int^{\infty} \delta(t) = 1$ | f(−1) = 0, f(0) ≅ ∞, f(1) = 0 |
| Σ | Summation | Function | $_{n=0}^{3}\Sigma n = 6$ |
| u(t) | unit step function | Function | u(−1) = 0, u(0) = 1, u(1) = 1 |
| s(t) | String array | Array | s(3) = StringArray[3] = 'hello' |

TABLE 2 example signals

| Signal | Parameters | Equation |
|---|---|---|
| Ramp | b, m | f(t) = b + m * t |
| PeriodicRamp | b, m, T | f(t) = Σ(b + m * (t − nT)) u(t − nT) |
| AlternatingRamp | b, m, T | f(t) = (b + m * t) * $(-1)^{(2T+t)/T}$ |
| SquareWave | b, m, T | f(t) = b + m[S(u(t − nT) − 2u(t − (n + 1/2)T) + u(t − (n + 1)T)] |
| CarrierSquareWave | b, m, T, T' = 1/10 T | f(t) = b + m[Σ(u(t − nT) − 2u(t − (n + 1/2) T) + u(t − (n + 1)T) + Σ(1/10(u(t − nT') − 2u(t − (n + 1/2)T') + u(t − (n + 1)T')] |
| StringGenerator | T, StringArray | f(t) = ∫δ(t − nT)<br>s(t) = StringArray[f(t)] |

A signal generator of the present invention may also include a generic user interface, or GUI. This can provide for an easy reconfiguration of the signals, as described above, by allowing a user or developer to simply select or enter an appropriate signal equation and variable values. There may be no need for the values used in the wave equations to be hard coded or stored in a source file, although at least some of the commonly used signals may be stored as such.

Another embodiment of the invention utilizes the signal generator as a string generator. This can be useful in applications where the accurate generation of a data stream, such as a stream of words, may be necessary for testing. In an example of a system in accordance with the present invention, a system may generate two strings, such as may represent "pass" and "fail." The application could determine the test signal that would be produced when transmitting that string of text, and the string generator could generate the appropriate signal. The monitor or notification listener could then store the signal as received, which could then be compared against the test signal to quickly determine the accuracy of the monitor.

Other features, aspects and objects of the invention can be obtained from a review of the figures and the claims. It is to be understood that other embodiments of the invention can be developed and fall within the spirit and scope of the invention and claims.

The foregoing description of preferred embodiments of the present invention has been provided for the purposes of illustration and description. It is not intended to be exhaustive or to limit the invention to the precise forms disclosed. Obviously, many modifications and variations will be apparent to the practitioner skilled in the art. The embodiments were chosen and described in order to best explain the principles of the invention and its practical application, thereby enabling others skilled in the art to understand the invention for various embodiments and with various modifications that are suited to the particular use contemplated. It is intended that the scope of the invention be defined by the following claims and their equivalence.

What is claimed is:

1. A system for testing JMX monitors, the system comprising:
    (a) a generator software object adapted to generate a time varying signal;
    (b) a JMX monitor object adapted to monitor said time varying signal and to return appropriate testing values; and
    (c) a notifier software object adapted to generate a notification in response to the monitoring of said time varying signal by the JMX monitor object.

2. A system according to claim 1, further comprising a source of at least one equation to be used in generating the signal.

3. A system according to claim 2, wherein said source is selected from the group consisting of data libraries, data files, application code, or user entry.

4. A system according to claim 1, further comprising a listener for receiving said notification.

5. A system according to claim 1, further comprising an interface adapted to allow entry of at least one parameter to be used in generating said time varying signal.

6. A system according to claim 1, further comprising a timer, adapted to control the time for testing.

7. A system according to claim 1, wherein said JMX monitor object monitors said time varying signal at a frequency at least twice the frequency of said time varying signal.

8. A system according to claim 1, further comprising a processor adapted to execute the generation of said time varying signal.

9. A system according to claim 1, wherein said software object is a MBean.

10. A method for testing a JMX monitor, the method comprising the steps of:
    (a) generating a time varying signal using a generator software object;
    (b) polling said generator software object at a frequency at least twice the frequency of the generated time varying signal using a monitor object of the JMX monitor; and
    (c) returning a testing value for each polling of said generator software object.

11. A method according to claim 10, further comprising the step of generating a notification when a threshold value of the testing signal is detected by said monitor object.

12. A method according to claim 10, further comprising the step of storing the testing values to a data store.

13. A method according to claim 10, further comprising the step of comparing each testing value to the corresponding value of said time varying signal from said generator software object.

14. A method according to claim 10, further comprising the step of specifying an equation to be used in generating said time varying signal.

15. A method according to claim 10, further comprising the step of specifying at least one parameter to be used in generating said time varying signal.

16. A method according to claim 10, further comprising the step of specifying the frequency of polling.

17. A method according to claim 10, wherein said software object is a MBean.

18. A system for testing JMX monitors, the system comprising:
   (a) a generator software object adapted to generate a time varying unorthodox signal;
   (b) a JMX monitor object adapted to monitor said time varying unorthodox signal; and
   (c) a notifier software object adapted to generate a notification in response to the monitoring of said time varying unorthodox signal by said JMX monitor object.

19. A system according to claim 18, wherein said time varying unorthodox signal comprises of a string of words.

20. A method for testing a JMX monitor, the method comprising the steps of:
   (a) generating a time varying unorthodox signal using a generator software object;
   (b) polling said generator software object at a frequency at least twice the frequency of the generated time varying unorthodox signal using a monitor object of the JMX monitor; and
   (c) returning a testing value for each polling of the said generator software object.

21. A method according to claim 20, wherein said time varying unorthodox signal comprises of a string of words.

* * * * *